(12) United States Patent
Ghouse et al.

(10) Patent No.: US 12,493,489 B2
(45) Date of Patent: Dec. 9, 2025

(54) METHOD AND SYSTEM FOR MONITORING CLOUD APPLICATIONS

(71) Applicant: JPMorgan Chase Bank, N.A., New York, NY (US)

(72) Inventors: Abdul Subhan Shoukat Ghouse, Hyderabad (IN); Akram Hussain Choudhury, Guwahati (IN); Anand Sirvisetti, Kakinada (IN)

(73) Assignee: JPMORGAN CHASE BANK, N.A, New York, NY (US)

( * ) Notice: Subject to any disclaimer, the term of this patent is extended or adjusted under 35 U.S.C. 154(b) by 546 days.

(21) Appl. No.: 17/976,186

(22) Filed: Oct. 28, 2022

(65) Prior Publication Data

US 2023/0139660 A1 May 4, 2023

(30) Foreign Application Priority Data

Oct. 29, 2021 (IN) .............................. 202111049602

(51) Int. Cl.
*G06F 9/44* (2018.01)
*G06F 9/48* (2006.01)
*G06F 11/34* (2006.01)

(52) U.S. Cl.
CPC ........ *G06F 9/4881* (2013.01); *G06F 11/3495* (2013.01)

(58) Field of Classification Search
CPC ...................................................... G06F 9/4881
USPC ........................................................... 718/101
See application file for complete search history.

(56) References Cited

U.S. PATENT DOCUMENTS

| | | | |
|---|---|---|---|
| 2013/0132561 A1* | 5/2013 | Pasala ................. | H04L 67/1097 709/224 |
| 2015/0134593 A1* | 5/2015 | Ramesh ................ | G06F 16/254 707/602 |
| 2020/0379806 A1* | 12/2020 | Mann .................... | G06F 9/4818 |

\* cited by examiner

*Primary Examiner* — Timothy A Mudrick
(74) *Attorney, Agent, or Firm* — GREENBLUM & BERNSTEIN, P.L.C.

(57) ABSTRACT

A method for monitoring cloud-based applications that are integral to the performance of ongoing jobs and operations in order to provide status notifications and alerts when problems or breaches occur is provided. The method includes: receiving information that relates to a cluster of jobs that are using a cloud-based application and information that relates to a status of ongoing jobs; calculating a cost associated with the cluster and/or the ongoing jobs; analyzing the received information to diagnose problems and to determine whether a service level agreement is being breached; generating an alert when a problem is diagnosed and/or the service level agreement is determined as being breached; and displaying, on a dashboard user interface, information about the cluster and the ongoing jobs and any alerts that have been generated.

18 Claims, 5 Drawing Sheets

METHOD AND SYSTEM FOR MONITORING CLOUD APPLICATIONS

CROSS-REFERENCE TO RELATED APPLICATIONS

This application claims priority benefit from Indian Application No. 202111049602, filed Oct. 29, 2021, which is hereby incorporated by reference in its entirety.

BACKGROUND

1. Field of the Disclosure

This technology generally relates to methods and systems for monitoring operational status, and more particularly to methods and systems for monitoring cloud-based applications that are integral to the performance of ongoing jobs and operations in order to provide status notifications and alerts when problems or breaches occur.

2. Background Information

Cloud applications require constant monitoring by corresponding personnel in order to ensure that jobs remain on track for successful and timely completion. For time-critical jobs, it is important for a team to have a live view of jobs and their statuses, and to receive alerts when problems arise and/or when a breach of a service level agreement (SLA) occurs. It is also important for the team to understand cost allocations of jobs in order to identify hotspots that consume more runtime and cost. Such hotspots can then be addressed by the team for further optimization.

Conventionally, tools that are usable for monitoring of cloud applications are difficult to customize, require a relatively steep learning curve, may require licensing which may be relatively expensive, and are generally unsuitable for monitoring requirements. Accordingly, there is a need for a flexible and user-friendly mechanism for monitoring cloud-based applications that are integral to the performance of ongoing jobs and operations in order to provide status notifications and alerts when problems or breaches occur.

SUMMARY

The present disclosure, through one or more of its various aspects, embodiments, and/or specific features or sub-components, provides, inter alia, various systems, servers, devices, methods, media, programs, and platforms for monitoring cloud-based applications that are integral to the performance of ongoing jobs and operations in order to provide status notifications and alerts when problems or breaches occur.

According to an aspect of the present disclosure, a method for monitoring a cloud-based application is provided. The method is implemented by at least one processor. The method includes: receiving, by the at least one processor, first information that relates to a cluster of jobs that are using a cloud-based application; receiving, by the at least one processor, second information that relates to a status of at least one ongoing job from among the cluster of jobs; calculating, by the at least one processor based on the first information and the second information, a cost associated with at least one from among the cluster and the at least one ongoing job; determining, by the at least one processor based on the first information and the second information, whether a service level agreement is being breached; and displaying, by the at least one processor on a dashboard user interface, at least a subset of the first information and at least a subset of the second information.

The first information may include at least one from among a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, a lapsed time of the cluster, and an indication of a service level agreement breach.

The second information may include at least one from among a job identifier, a cluster identifier, a job name, a status time, a start time, an end time, a job status, a job failure message, a job run time, a job cost, and an indication of a service level agreement breach.

The determining of whether the service level agreement is being breached may include determining at least one from among whether an elapsed time breach is occurring and whether a runtime breach is occurring.

The determining of whether the service level agreement is being breached may include using runtime statistics to determine whether the service level agreement is being breached.

The method may further include: when a determination is made that the service level agreement is being breached, generating a first alert that relates to the breaching of the service level agreement and displaying the first alert on the dashboard user interface.

The method may further include: analyzing, by the at least one processor, the first information to determine whether a first problem that relates to the cluster has occurred; analyzing, by the at least one processor, the second information to determine whether a second problem that relates to the at least one ongoing job has occurred; receiving, by the at least one processor, third information that relates to an environment in which the cloud-based application is executing; analyzing, by the at least one processor, the third information to determine whether a third problem that relates to the environment has occurred; and when a determination is made that at least one from among the first problem, the second problem, and the third problem has occurred, generating, by the at least one processor, a second alert that relates to the determination, and displaying the second alert on the dashboard user interface.

The third information may include at least one from among at least one spot instance being dropped during a run and excessive Hadoop Distributed File System (HFDS) usage.

The method may further include: web-scrapping an Amazon Web Services (AWS) spot instances advisor; determining, based on a result of the web-scrapping, an AWS spot instances availability and an AWS spot instances live interruption frequency; and displaying the determined AWS spot instances availability and the determined AWS spot instances live interruption frequency on the dashboard user interface.

According to another exemplary embodiment, a computing apparatus for providing a secure conversation gateway is provided. The computing apparatus includes a processor; a memory; a display; and a communication interface coupled to each of the processor, the memory, and the display. The processor is configured to: receive, via the communication interface, first information that relates to a cluster of jobs that are using a cloud-based application; receive, via the communication interface, second information that relates to a status of at least one ongoing job from among the cluster of jobs; calculate, based on the first information and the second information, a cost associated with at least one from among the cluster and the at least one ongoing job; determine, based on the first information and the second information, whether a service level agreement is being breached; and cause the display to display, via a dashboard user interface, at least a subset of the first information and at least a subset of the second information.

The first information may include at least one from among a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, a lapsed time of the cluster, and an indication of a service level agreement breach.

The second information may include at least one from among a job identifier, a cluster identifier, a job name, a status time, a start time, an end time, a job status, a job failure message, a job run time, a job cost, and an indication of a service level agreement breach.

The processor may be further configured to determine whether the service level agreement is being breached by determining at least one from among whether an elapsed time breach is occurring and whether a runtime breach is occurring.

The processor may be further configured to use runtime statistics to determine whether the service level agreement is being breached.

The processor may be further configured to: when a determination is made that the service level agreement is being breached, generate a first alert that relates to the breaching of the service level agreement and cause the display to display the first alert via the dashboard user interface.

The processor may be further configured to: analyze the first information to determine whether a first problem that relates to the cluster has occurred; analyze the second information to determine whether a second problem that relates to the at least one ongoing job has occurred; receive, via the communication interface, third information that relates to an environment in which the cloud-based application is executing; analyze the third information to determine whether a third problem that relates to the environment has occurred; and when a determination is made that at least one from among the first problem, the second problem, and the third problem has occurred, generate a second alert that relates to the determination, and cause the display to display the second alert via the dashboard user interface.

The third information may include at least one from among at least one spot instance being dropped during a run and excessive Hadoop Distributed File System (HFDS) usage.

The processor may be further configured to: web-scrap an Amazon Web Services (AWS) spot instances advisor; determine, based on a result of the web-scrapping, an AWS spot instances availability and an AWS spot instances live interruption frequency; and cause the display to display the determined AWS spot instances availability and the determined AWS spot instances live interruption frequency via the dashboard user interface.

According to yet another exemplary embodiment, a non-transitory computer readable storage medium storing instructions for monitoring a cloud-based application is provided. The storage medium includes executable code which, when executed by a processor, causes the processor to: receive first information that relates to a cluster of jobs that are using a cloud-based application; receive second information that relates to a status of at least one ongoing job from among the cluster of jobs; calculate, based on the first information and the second information, a cost associated with at least one from among the cluster and the at least one ongoing job; determine, based on the first information and the second information, whether a service level agreement is being breached; and display, via a dashboard user interface, at least a subset of the first information and at least a subset of the second information.

The first information may include at least one from among a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, a lapsed time of the cluster, and an indication of a service level agreement breach.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
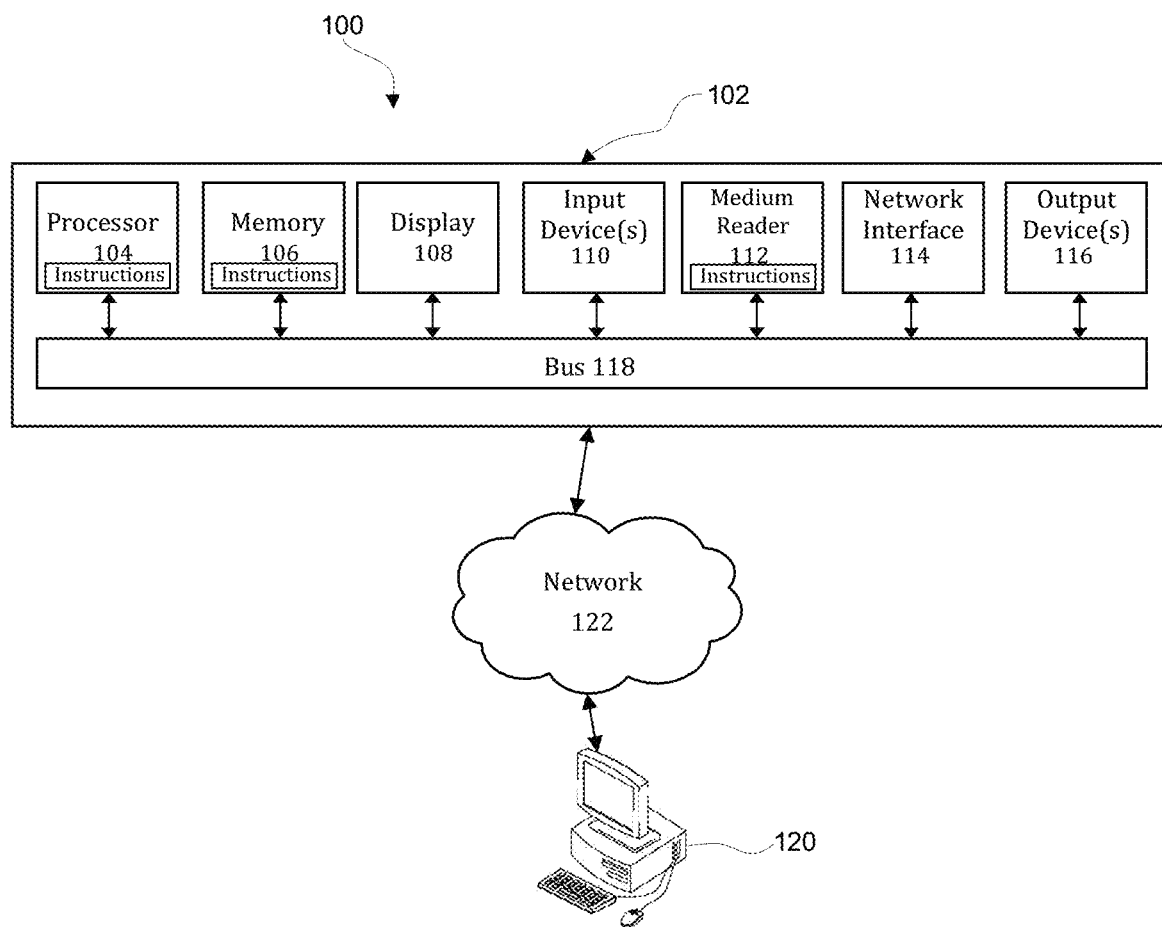
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for monitoring cloud-based applications that are integral to the performance of ongoing jobs and operations in order to provide status notifications and alerts when problems or breaches occur.

Figure 2:
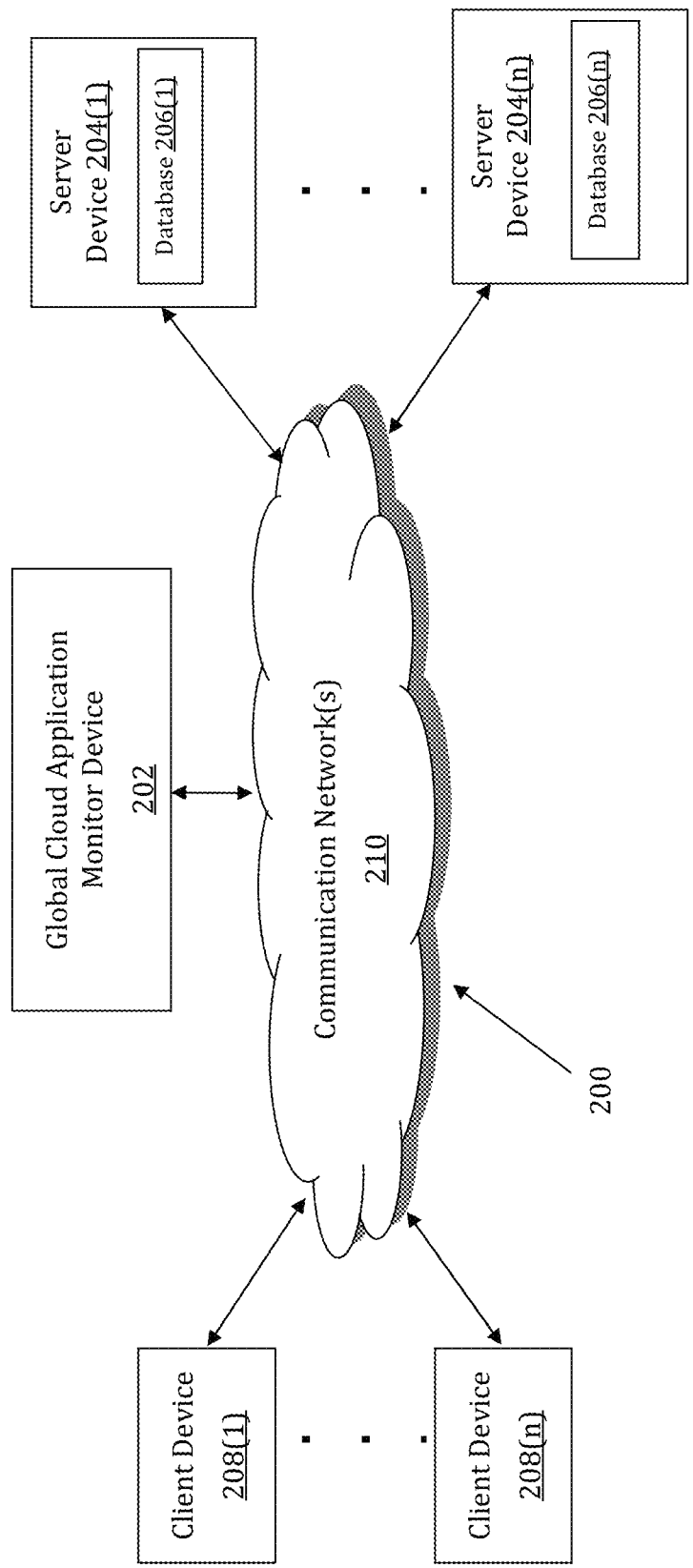
FIG. 2 illustrates an exemplary diagram of a network environment.

Referring to FIG. 2, a schematic of an exemplary network environment 200 for implementing a method for monitoring cloud-based applications that are integral to the performance of ongoing jobs and operations in order to provide status notifications and alerts when problems or breaches occur is illustrated. In an exemplary embodiment, the method is executable on any networked computer platform, such as, for example, a personal computer (PC).

The method for monitoring cloud-based applications that are integral to the performance of ongoing jobs and operations in order to provide status notifications and alerts when problems or breaches occur may be implemented by a Global Cloud Application Monitoring (GCAM) device 202. The GCAM device 202 may be the same or similar to the computer system 102 as described with respect to FIG. 1. The GCAM device 202 may store one or more applications that can include executable instructions that, when executed by the GCAM device 202, cause the GCAM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GCAM device 202 itself, may be located in virtual server(s) running in a cloud-based computing environment rather than being tied to one or more specific physical network computing devices. Also, the application(s) may be running in one or more virtual machines (VMs) executing on the GCAM device 202. Additionally, in one or more embodiments of this technology, virtual machine(s) running on the GCAM device 202 may be managed or supervised by a hypervisor.

In the network environment 200 of FIG. 2, the GCAM device 202 is coupled to a plurality of server devices 204(1)-204(n) that hosts a plurality of databases 206(1)-206(n), and also to a plurality of client devices 208(1)-208(n) via communication network(s) 210. A communication interface of the GCAM device 202, such as the network interface 114 of the computer system 102 of FIG. 1, operatively couples and communicates between the GCAM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GCAM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and GCAM devices that efficiently implement a method for monitoring cloud-based applications that are integral to the performance of ongoing jobs and operations in order to provide status notifications and alerts when problems or breaches occur.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The GCAM device 202 may be a standalone device or integrated with one or more other devices or apparatuses, such as one or more of the server devices 204(1)-204(n), for example. In one particular example, the GCAM device 202 may include or be hosted by one of the server devices 204(1)-204(n), and other arrangements are also possible. Moreover, one or more of the devices of the GCAM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GCAM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to job status and data that relates to service level agreements (SLAs).

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the GCAM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the GCAM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the GCAM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GCAM device 202, the server devices 204(1)-204(n), or the client devices 208(1)-208(n), for example, may be configured to operate as virtual instances on the same physical machine. In other words, one or more of the GCAM device 202, the server devices 204(1)-204(n), or the client devices 208(1)-208(n) may operate on the same physical device rather than as separate devices communicating through communication network(s) 210. Additionally, there may be more or fewer GCAM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
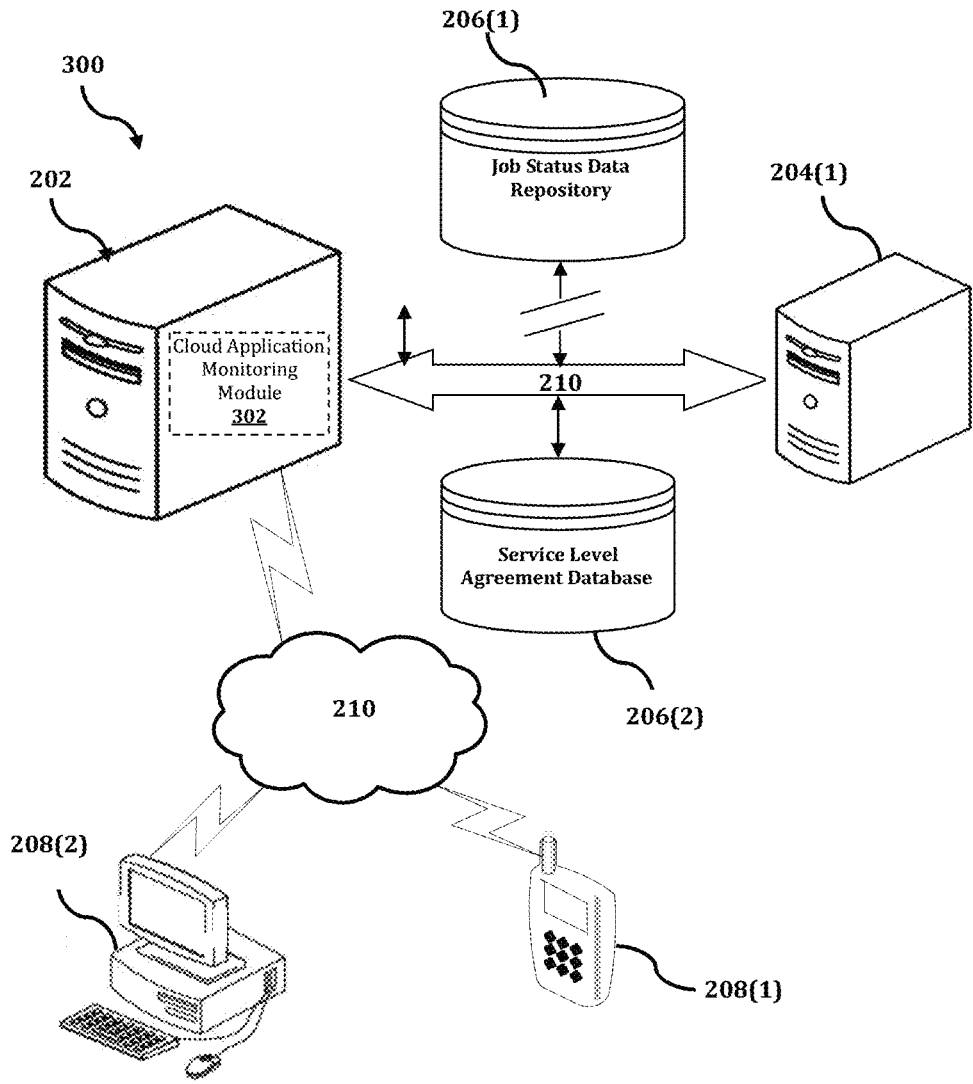
FIG. 3 shows an exemplary system for implementing a method for monitoring cloud-based applications that are integral to the performance of ongoing jobs and operations in order to provide status notifications and alerts when problems or breaches occur.

The GCAM device 202 is described and illustrated in FIG. 3 as including a cloud application monitoring module 302, although it may include other rules, policies, modules, databases, or applications, for example. As will be described below, the cloud application monitoring module 302 is configured to implement a method for monitoring cloud-based applications that are integral to the performance of ongoing jobs and operations in order to provide status notifications and alerts when problems or breaches occur.

An exemplary process 300 for implementing a cloud-agnostic mechanism for monitoring cloud-based applications that are integral to the performance of ongoing jobs and operations in order to provide status notifications and alerts when problems or breaches occur by utilizing the network environment of FIG. 2 is illustrated as being executed in FIG. 3. Specifically, a first client device 208(1) and a second client device 208(2) are illustrated as being in communication with GCAM device 202. In this regard, the first client device 208(1) and the second client device 208(2) may be "clients" of the GCAM device 202 and are described herein as such. Nevertheless, it is to be known and understood that the first client device 208(1) and/or the second client device 208(2) need not necessarily be "clients" of the GCAM device 202, or any entity described in association therewith herein. Any additional or alternative relationship may exist between either or both of the first client device 208(1) and the second client device 208(2) and the GCAM device 202, or no relationship may exist.

Further, GCAM device 202 is illustrated as being able to access a job status data repository 206(1) and a service level agreement database 206(2). The cloud application monitoring module 302 may be configured to access these databases for implementing a method for monitoring cloud-based applications that are integral to the performance of ongoing jobs and operations in order to provide status notifications and alerts when problems or breaches occur.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the GCAM device 202 via broadband or cellular communication. Of course, these embodiments are merely exemplary and are not limiting or exhaustive.

Upon being started, the cloud application monitoring module 302 executes a cloud-agnostic process for monitoring cloud-based applications that are integral to the performance of ongoing jobs and operations in order to provide status notifications and alerts when problems or breaches occur. In this aspect, the cloud-agnostic quality of the process indicates that the process is applicable for monitoring cloud-based applications that are hosted in any cloud-based server and/or architecture. An exemplary process for monitoring cloud-based applications that are integral to the performance of ongoing jobs and operations in order to provide status notifications and alerts when problems or breaches occur is generally indicated at flowchart 400 in FIG. 4.

Figure 4:
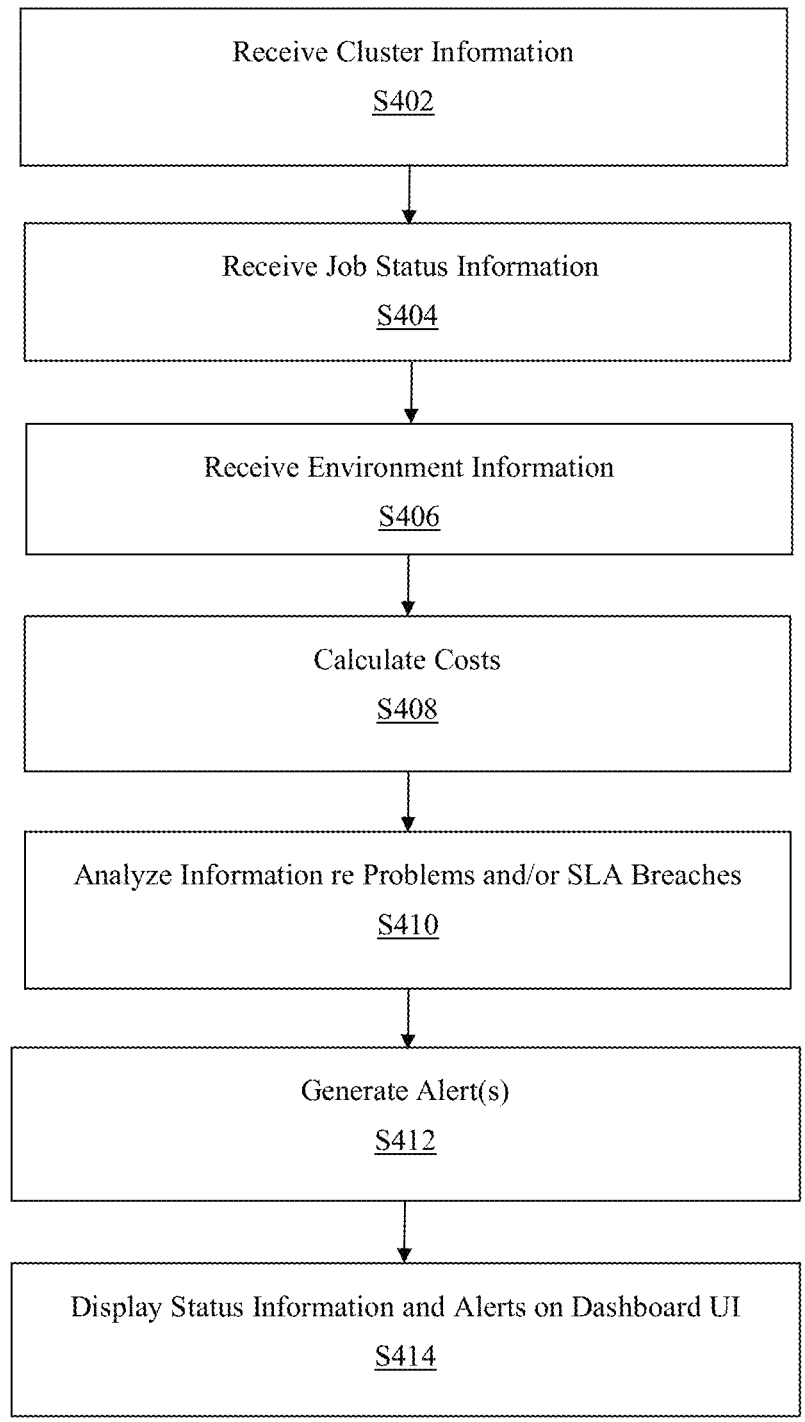
FIG. 4 is a flowchart of an exemplary process for implementing a method for monitoring cloud-based applications that are integral to the performance of ongoing jobs and operations in order to provide status notifications and alerts when problems or breaches occur.

In process 400 of FIG. 4, at step S402, the cloud application monitoring module 302 receives first information that relates to a cluster of jobs that are using a cloud-based application. In an exemplary embodiment, the cluster information may include any one or more of a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, a lapsed time of the cluster, and an indication of a service level agreement breach.

At step S404, the cloud application monitoring module 302 receives second information that relates to a status of at least one ongoing job from among the cluster of jobs. In an exemplary embodiment, the job status information may include any one or more of a job identifier, a cluster identifier, a job name, a status time, a start time, an end time, a job status, a job failure message, a job run time, a job cost, and an indication of a service level agreement breach.

Figure 5:
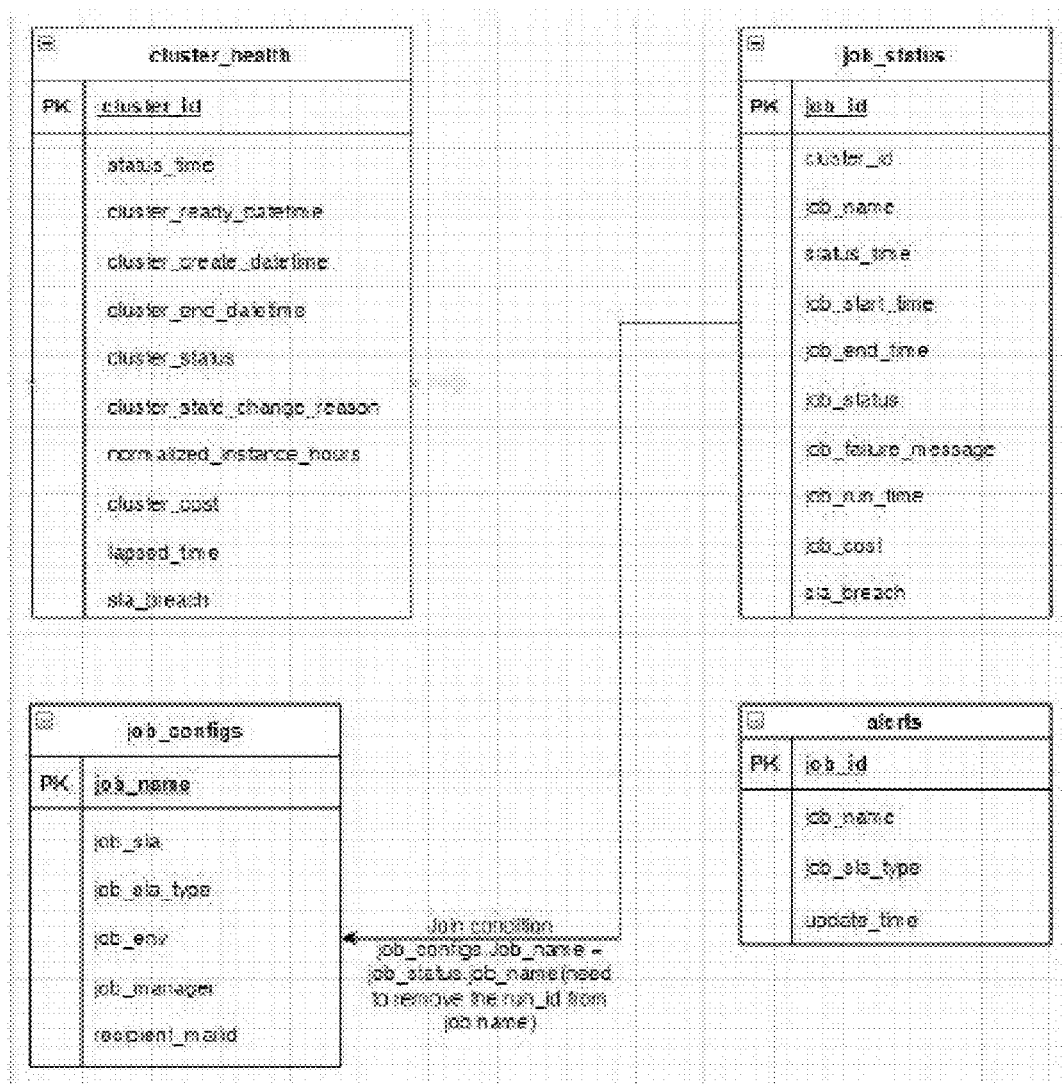
FIG. 5 is a diagram that illustrates cluster information and job information that may be used for monitoring cloud-based applications that are integral to the performance of ongoing jobs and operations in order to provide status notifications and alerts when problems or breaches occur, according to an exemplary embodiment.

FIG. 5 is a diagram 500 that illustrates cluster information and job information that may be used for monitoring cloud-based applications that are integral to the performance of ongoing jobs and operations in order to provide status notifications and alerts when problems or breaches occur, according to an exemplary embodiment. As illustrated in FIG. 5, various types of cluster information and various types of job information are available for monitoring the cloud-based applications, as described above with respect to steps S402 and S404.

At step S406, the cloud application monitoring module 302 receives third information that relates to an environment in which the cloud-based application is being executed. In an exemplary embodiment, the environment information may include any one or more of spot instances dropped during a run, heavy and/or excessive Hadoop Distributed File System (HDFS) usage, and/or any other information that relates to the computing environment.

At step S408, the cloud application monitoring module 302 uses the cluster information, the job status information, and the environment information to calculate costs associated with ongoing jobs and/or the cloud-based application. Then, at step S410, the cloud application monitoring module 302 analyzes each of the cluster information, the job status information, and the environment information to determine whether there are any problems to be addressed and/or whether any service level agreements (SLAs) are being breached. In an exemplary embodiment, the calculated costs may be compared with expected costs in order to pinpoint areas of concern and/or potential SLA breaches. Potential SLA breaches may include elapsed time breaches and/or runtime breaches, and may correspond to operational metrics such as runtime statistics.

At step S412, the cloud application monitoring module 302 generates one or more alerts based on a determination in step S410 that a problem has arisen and/or that an SLA has been breached. Then, at step S414, the cloud application monitoring module 302 displays relevant status information and alerts on a dashboard user interface.

In an exemplary embodiment, the cloud application monitoring module 302 may implement a functionality that relates to the spot instances advisor associated with Amazon Web Services. This functionality may include the following operations: web-scrapping the AWS spot instances advisor; determining, based on a result of the web-scrapping, an AWS spot instances availability and an AWS spot instances live interruption frequency; and displaying the determined AWS spot instances availability and the determined AWS spot instances live interruption frequency on the dashboard user interface. In an exemplary embodiment, the functionality may also provide an alerting system that generates alerts for SLA breaches associated with AWS, cost overruns associated with AWS, service failures and/or job failures associated with AWS, and idle service monitoring associated with AWS. The functionality may also provide monitoring for key services associated with AWS, including monitoring of service runtimes, monitoring of actual costs incurred, and monitoring of service failures.

In an exemplary embodiment, the cloud application monitoring module 302 may implement a functionality that relates to providing information that relates to costs associated with a cluster of jobs. The information that relates to cluster costs may include any one or more of monthly planned or predicted costs; actual costs as a function of time;

details that relate to the cluster of jobs, such as software version number, availability zone (AZ) information, and subnet identification information; and statistics that relate to the cluster of jobs, such as numbers of machines, instance names, machine types, number of machine cores in use, amounts of memory being used, machine cost per minute, and total running cost.

In an exemplary embodiment, the cloud application monitoring module 302 may generate a graph that illustrates a breakdown of planned costs versus actual costs as a function of time, with months of the year shown along the x-axis and costs shown along the y-axis. The costs may be broken down according to individual jobs within the cluster by using color coding that indicates a respective color for each corresponding job. In an exemplary embodiment, the planned costs versus actual costs graph may be displayed on the dashboard user interface in order to allow users to easily grasp the cost information. In an exemplary embodiment, the dashboard user interface may also display tabular information that provides cluster details and/or individual job details, in a manner that enables a user to click on an individual cluster or an individual job to prompt a display of additional specific details that relate to the clicked item.

In an exemplary embodiment, the cloud application monitoring module 302 may generate and continuously update a machine learning model that uses historical information about jobs that have previously been submitted to predict a number of jobs in the future, a capacity that is required, and the costs associated therewith. The historical information may include information that indicates the types of jobs that have been performed, the amounts of resources used, whether the jobs used spot instances or on-demand instances, and total costs associated with the jobs.

Accordingly, with this technology, an optimized process for monitoring cloud-based applications that are integral to the performance of ongoing jobs and operations in order to provide status notifications and alerts when problems or breaches occur is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for monitoring a cloud-based application, the method being implemented by at least one processor, the method comprising:
   receiving, by the at least one processor, first information that relates to a cluster of jobs that are using a cloud-based application;
   receiving, by the at least one processor, second information that relates to a status of at least one ongoing job from among the cluster of jobs;
   calculating, by the at least one processor based on the first information and the second information, a cost associated with at least one from among the cluster and the at least one ongoing job;
   determining, by the at least one processor based on the first information and the second information, whether a service level agreement is being breached by determining at least one from among whether an elapsed time breach is occurring and whether a runtime breach is occurring; and
   displaying, by the at least one processor on a dashboard user interface, at least a subset of the first information and at least a subset of the second information.

2. The method of claim 1, wherein the first information includes at least one from among a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, and a lapsed time of the cluster.

3. The method of claim 1, wherein the second information includes at least one from among a job identifier, a cluster identifier, a job name, a status time, a start time, an end time, a job status, a job failure message, and a job run time.

4. The method of claim 1, wherein the determining of whether the service level agreement is being breached comprises using runtime statistics to determine whether the service level agreement is being breached.

5. The method of claim 1, further comprising:
   when a determination is made that the service level agreement is being breached, generating a first alert that relates to the breaching of the service level agreement and displaying the first alert on the dashboard user interface.

6. The method of claim 5, further comprising:
   analyzing, by the at least one processor, the first information to determine whether a first problem that relates to the cluster has occurred;
   analyzing, by the at least one processor, the second information to determine whether a second problem that relates to the at least one ongoing job has occurred;
   receiving, by the at least one processor, third information that relates to an environment in which the cloud-based application is executing;
   analyzing, by the at least one processor, the third information to determine whether a third problem that relates to the environment has occurred; and
   when a determination is made that at least one from among the first problem, the second problem, and the third problem has occurred, generating, by the at least one processor, a second alert that relates to the determination, and displaying the second alert on the dashboard user interface.

7. The method of claim 6, wherein the third information includes at least one from among at least one spot instance being dropped during a run and excessive Hadoop Distributed File System (HFDS) usage.

8. The method of claim 1, further comprising:
   web-scrapping an Amazon Web Services (AWS) spot instances advisor;
   determining, based on a result of the web-scrapping, an AWS spot instances availability and an AWS spot instances live interruption frequency; and
   displaying the determined AWS spot instances availability and the determined AWS spot instances live interruption frequency on the dashboard user interface.

9. A computing apparatus for monitoring a cloud-based application, the computing apparatus comprising:
   a processor;
   a memory;
   a display; and
   a communication interface coupled to each of the processor, the memory, and the display, wherein the processor is configured to:
   receive, via the communication interface, first information that relates to a cluster of jobs that are using a cloud-based application;
   receive, via the communication interface, second information that relates to a status of at least one ongoing job from among the cluster of jobs;
   calculate, based on the first information and the second information, a cost associated with at least one from among the cluster and the at least one ongoing job;
   determine, based on the first information and the second information, whether a service level agreement is being breached by determining at least one from among whether an elapsed time breach is occurring and whether a runtime breach is occurring; and
   cause the display to display, via a dashboard user interface, at least a subset of the first information and at least a subset of the second information.

10. The computing apparatus of claim 9, wherein the first information includes at least one from among a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, and a lapsed time of the cluster.

11. The computing apparatus of claim 9, wherein the second information includes at least one from among a job identifier, a cluster identifier, a job name, a status time, a start time, an end time, a job status, a job failure message, and a job run time.

12. The computing apparatus of claim 9, wherein the processor is further configured to use runtime statistics to determine whether the service level agreement is being breached.

13. The computing apparatus of claim 9, wherein the processor is further configured to:
when a determination is made that the service level agreement is being breached, generate a first alert that relates to the breaching of the service level agreement and cause the display to display the first alert via the dashboard user interface.

14. The computing apparatus of claim 13, wherein the processor is further configured to:
analyze the first information to determine whether a first problem that relates to the cluster has occurred;
analyze the second information to determine whether a second problem that relates to the at least one ongoing job has occurred;
receive, via the communication interface, third information that relates to an environment in which the cloud-based application is executing;
analyze the third information to determine whether a third problem that relates to the environment has occurred; and
when a determination is made that at least one from among the first problem, the second problem, and the third problem has occurred, generate a second alert that relates to the determination, and cause the display to display the second alert via the dashboard user interface.

15. The computing apparatus of claim 14, wherein the third information includes at least one from among at least one spot instance being dropped during a run and excessive Hadoop Distributed File System (HFDS) usage.

16. The computing apparatus of claim 9, wherein the processor is further configured to:
web-scrap an Amazon Web Services (AWS) spot instances advisor;
determine, based on a result of the web-scrapping, an AWS spot instances availability and an AWS spot instances live interruption frequency; and
cause the display to display the determined AWS spot instances availability and the determined AWS spot instances live interruption frequency via the dashboard user interface.

17. A non-transitory computer readable storage medium storing instructions for monitoring a cloud-based application, the storage medium comprising executable code which, when executed by a processor, causes the processor to:
receive first information that relates to a cluster of jobs that are using a cloud-based application;
receive second information that relates to a status of at least one ongoing job from among the cluster of jobs;
calculate, based on the first information and the second information, a cost associated with at least one from among the cluster and the at least one ongoing job;
determine, based on the first information and the second information, whether a service level agreement is being breached by determining at least one from among whether an elapsed time breach is occurring and whether a runtime breach is occurring; and
display, via a dashboard user interface, at least a subset of the first information and at least a subset of the second information.

18. The storage medium of claim 17, wherein the first information includes at least one from among a cluster identifier, a status time, a date and time at which the cluster is ready, a date and time at which the cluster is created, a date and time at which the cluster is ended, a cluster status, a reason for a state transition of the cluster, a time interval of a normalized instance of the cluster, and a lapsed time of the cluster.

\* \* \* \* \*